(12) United States Patent
Glaser et al.

(10) Patent No.: US 12,415,470 B2
(45) Date of Patent: Sep. 16, 2025

(54) ADAPTIVE ACCESSORY CONTROL IN A VEHICLE

(71) Applicant: Rivian IP Holdings, LLC, Irvine, CA (US)

(72) Inventors: Erik Robert Glaser, San Mateo, CA (US); Ryan Benedict, Costa Mesa, CA (US); Ashkan Hadian, Granada Hills, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 147 days.

(21) Appl. No.: 18/344,817

(22) Filed: Jun. 29, 2023

(65) Prior Publication Data

US 2025/0001957 A1   Jan. 2, 2025

(51) Int. Cl.
| | | |
|---|---|---|
| *B60R 16/023* | (2006.01) | |
| *B60K 35/00* | (2024.01) | |
| *B60K 35/90* | (2024.01) | |
| *E05B 47/00* | (2006.01) | |
| *G06F 3/147* | (2006.01) | |
| *G06F 3/16* | (2006.01) | |
| *H04R 1/02* | (2006.01) | |
| *H04R 3/00* | (2006.01) | |

(52) U.S. Cl.
CPC .......... *B60R 16/0231* (2013.01); *B60K 35/00* (2013.01); *E05B 47/00* (2013.01); *G06F 3/147* (2013.01); *G06F 3/162* (2013.01); *H04R 1/025* (2013.01); *H04R 3/00* (2013.01); *B60K 35/90* (2024.01); *E05B 2047/0067* (2013.01); *H04R 2499/13* (2013.01)

(58) Field of Classification Search
CPC .... B60R 16/0231; B60K 35/00; B60K 35/90; E05B 47/00; E05B 2047/0067; G06F 3/147; G06F 3/162; H04R 1/025; H04R 3/00; H04R 2499/13
See application file for complete search history.

(56) References Cited

U.S. PATENT DOCUMENTS

| | | | | |
|---|---|---|---|---|
| 3,632,157 | A  * | 1/1972  | Lohr       | B60N 2/012 296/39.1 |
| 2007/0241614 | A1 * | 10/2007 | Busdiecker | H02J 1/14 307/10.1 |
| 2018/0160273 | A1 * | 6/2018  | Huggins    | E05F 15/77 |
| 2020/0198467 | A1 * | 6/2020  | Shaughnessy | B60P 1/6409 |

FOREIGN PATENT DOCUMENTS

WO    2022132250 A1    6/2022

* cited by examiner

*Primary Examiner* — Lindsay M Low
*Assistant Examiner* — Charles J Brauch
(74) *Attorney, Agent, or Firm* — Patterson + Sheridan, LLP

(57) ABSTRACT

Certain aspects of the present disclosure provide systems and methods for adaptive accessory control in a vehicle. In certain embodiments, a system for adaptive accessory control in a vehicle includes a dock coupled to the vehicle and a vehicle control system communicably coupled to the dock. The dock includes a connection interface configured to receive and electrically connect to a plurality of accessories. The vehicle control system is operable to receive, from the dock, a first resistance value associated with a first accessory electrically connected to the dock via the connection interface. The vehicle control system is further operable to determine an identity of the first accessory based on the first resistance value and execute first vehicle program logic based on the determined identity of the first accessory.

19 Claims, 15 Drawing Sheets

ADAPTIVE ACCESSORY CONTROL IN A VEHICLE

INTRODUCTION

The present disclosure relates to vehicles, and more particularly, but not by way of limitation, to adaptive accessory control in a vehicle.

SUMMARY

In certain embodiments, one general aspect includes a system for adaptive accessory control in a vehicle. The system includes a dock coupled to the vehicle and a vehicle control system communicably coupled to the dock. The dock includes a connection interface configured to receive and electrically connect to a plurality of accessories. The vehicle control system is operable to receive, from the dock, a first resistance value associated with a first accessory electrically connected to the dock via the connection interface. The vehicle control system is further operable to determine an identity of the first accessory based on the first resistance value and execute first vehicle program logic based on the determined identity of the first accessory.

In certain embodiments, another general aspect includes a method of adaptive accessory control in a vehicle. The method includes receiving, by a vehicle control system, from a dock, a first resistance value associated with a first accessory electrically connected to the dock. The method also includes determining, by the vehicle control system, an identity of the first accessory based on the first resistance value. The method also includes executing, by the vehicle control system, first vehicle program logic based on the determined identity of the first accessory.

DETAILED DESCRIPTION

Certain embodiments herein are directed to a dock in a vehicle, the dock providing a common physical interface for various accessories to be utilized in the vehicle. Examples of accessories include coolers, refrigerators, safes, portable speakers, storage drawers or trays, power stations or jackeries, tackle boxes, organizers, and/or the like. Different accessories may have different capabilities and different ways in which the vehicle supports their operation. For example, some accessories may support wireless connectivity to the vehicle and/or be chargeable, while others may not have such capabilities. As another example, in certain embodiments, the vehicle may include one or more displays that show different information or interfaces depending on an accessory that is connected to the physical interface at a given time.

In certain embodiments, a vehicle control system communicably coupled to the dock can determine an identity of an accessory in the dock at a given time based on electrical resistance supplied by the accessory. In various embodiments, the vehicle control system executes vehicle program logic based on the determined identity of the accessory. In various embodiments, the electrical resistance supplied by the accessory allows the vehicle control system to distinguish the accessory from other accessories and the vehicle program logic that is executed is variable based on the determined identity of the accessory. Examples will be described relative to the Drawings.

Figure 1:
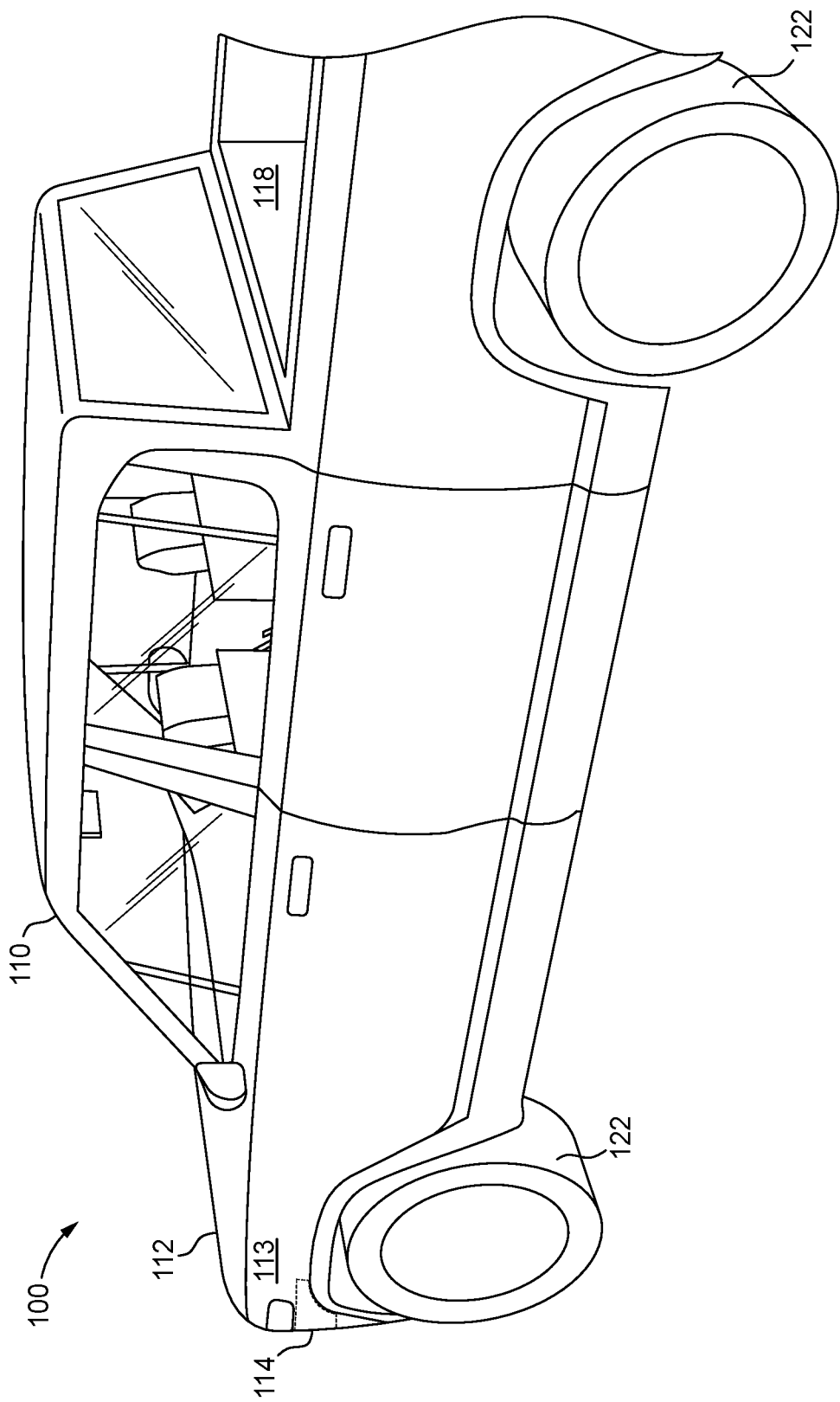
FIG. 1 illustrates an example electric vehicle, in accordance with certain embodiments of the present disclosure.

FIG. 1 depicts a diagram of electric vehicle 100, in accordance with embodiments of the present disclosure. Electric vehicle 100 includes, inter alia, a body, a propulsion system, an energy storage system, an auxiliary or accessory system, etc. Body 110 includes, inter alia, a frame or chassis, front end 112, driver side front quarter panel 113 with charging port cover 114, driver/passenger compartment or cabin 116, trunk or bed 118, a rear end, a frunk, stowage compartments, etc. Charging port cover 114 is located in driver side front quarter panel 113, and protects the charging port from the environment. Other charging port locations are also supported, such as the passenger side front quarter panel, the driver side rear quarter panel, the passenger side rear quarter panel, the rear end, in front end 112, etc. Additional charging ports may also be provided.

The propulsion system includes, inter alia, one or more electronic control units (ECUs), one, two or four (or more) electric motors with associated transmissions and drivetrains, a suspension subsystem, a steering subsystem, wheels 122, etc. The energy storage system can include, inter alia, one or more electronic control units (ECUs), battery pack, a vehicle charging subsystem including the charging port, etc. The auxiliary or accessory system includes, inter alia, one or more electronic control units (ECUs), an electrical power distribution system, a heating and air conditioning system, cabin displays, interior and exterior lighting systems, integrated electrical devices, etc.

Figure 2:
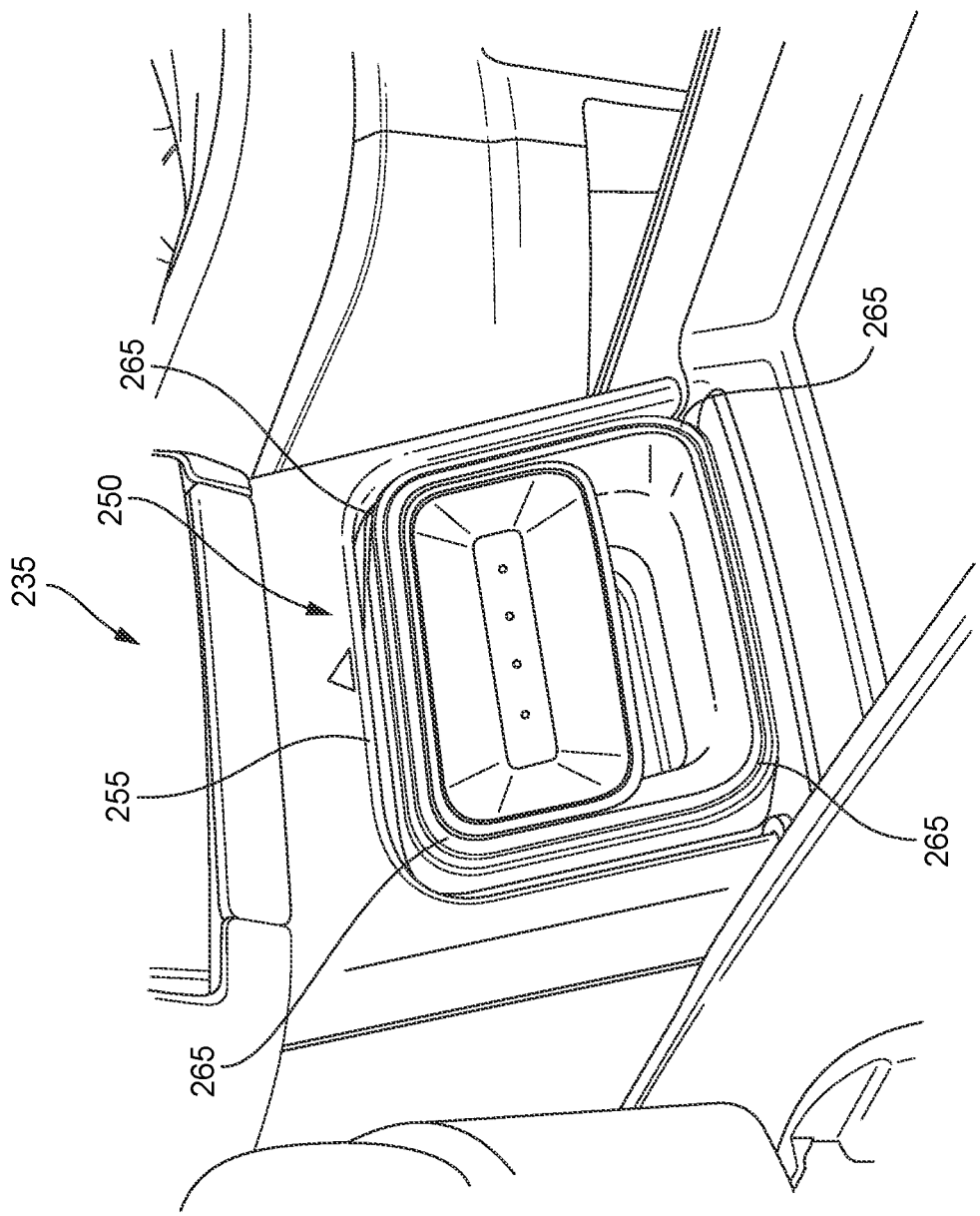
FIG. 2 illustrates an example vehicle console that may be incorporated in an interior of an electric vehicle, in accordance with embodiments of the present disclosure.

FIG. 2 illustrates a vehicle console 235 that can be incorporated in an interior of the electric vehicle 100, in accordance with embodiments of the present disclosure. The vehicle console 235 includes a dock 255 that is adapted to receive and selectively secure an accessory 250. In the example of FIG. 2, the accessory 250 is a portable speaker.

In various embodiments, corners 265 of the accessory 250 are shaped to help ensure that only a predetermined orientation may be possible while inserting the accessory 250 into the dock 255. In various embodiments, if desired, the dock 255 may be shaped to help contribute to ensuring proper orientation of the accessory 250. While the dock 255 as shown in FIG. 2 is positioned in the vehicle console 235, it will be appreciated that, in various embodiments, the dock 255 may be positioned in other locations of a vehicle, such as in a door, under a seat, in or adjacent to a storage compartment, a trunk, exterior the cabin and on an exterior portion of the body of the vehicle, and/or the like.

Figure 3A:
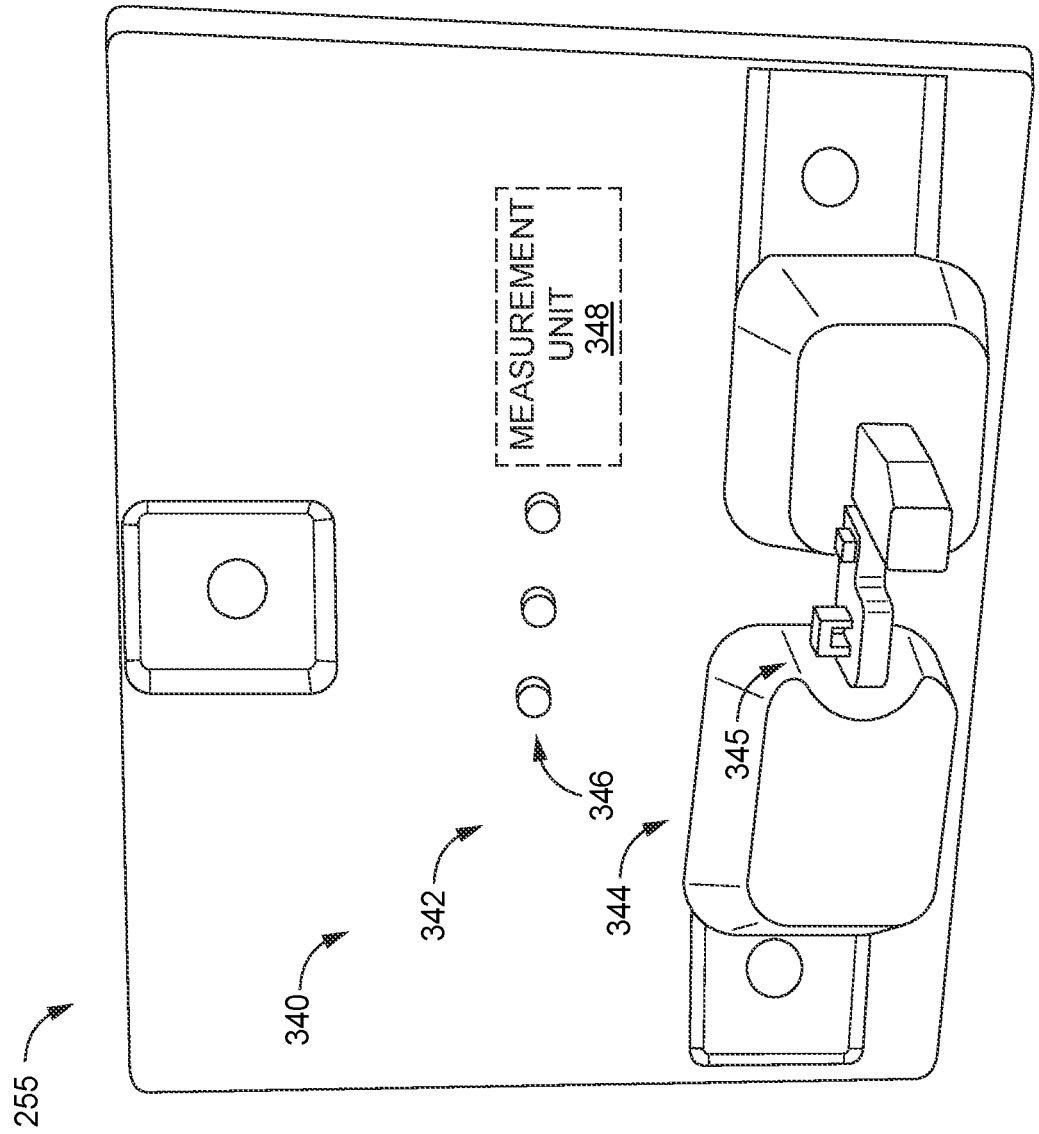
FIG. 3A illustrates an example connection interface of a dock, in accordance with embodiments of the present disclosure.

FIG. 3A illustrates an example of a connection interface 340 of the dock 255 of FIG. 2, in accordance with embodiments of the present disclosure. In certain embodiments, the connection interface 340 is operable to receive and electrically connect to a plurality of different accessories, such as the accessory 250 of FIG. 2. In the example of FIG. 3A, the connection interface 340 includes an electrical portion 342 and a securement portion 344.

In general, the electrical portion 342 of the connection interface 340 is configured to electrically connect to an accessory, such as the accessory 250 of FIG. 2, and provide electricity to the accessory (e.g., to charge and/or power the accessory). In the example of FIG. 3A, the electrical portion 342 includes a plurality of electrical pins 346 and a measurement unit 348. The electrical pins 346 are shown to be three in number, although it should be appreciated that two or any other suitable number may be utilized in various implementations. In some examples, one of the electrical pins 346 can correspond to a positive terminal, while the others can be connected to ground. As will be described in greater detail below, in certain embodiments, the measurement unit 348 is operable to measure resistance across the electrical pins 346, or to provide information usable to calculate resistance, for purposes of enabling identification of accessories, for example, by model, type, capabilities, and/or the like.

The securement portion 344 of the connection interface 340 is configured to receive and selectively secure an accessory, such as the accessory 250 of FIG. 2. In the example of FIG. 3A, the securement portion 344 includes a lock 345 that is configured to move between at least an unlocked state and a locked state. In general, the lock 345 secures the accessory so as to prevent removal while it is in the locked state, but allows removal of the accessory while it is in the unlocked state. The lock 345 can be, for example, a solenoid lock or another suitable type of lock.

Figure 3B:
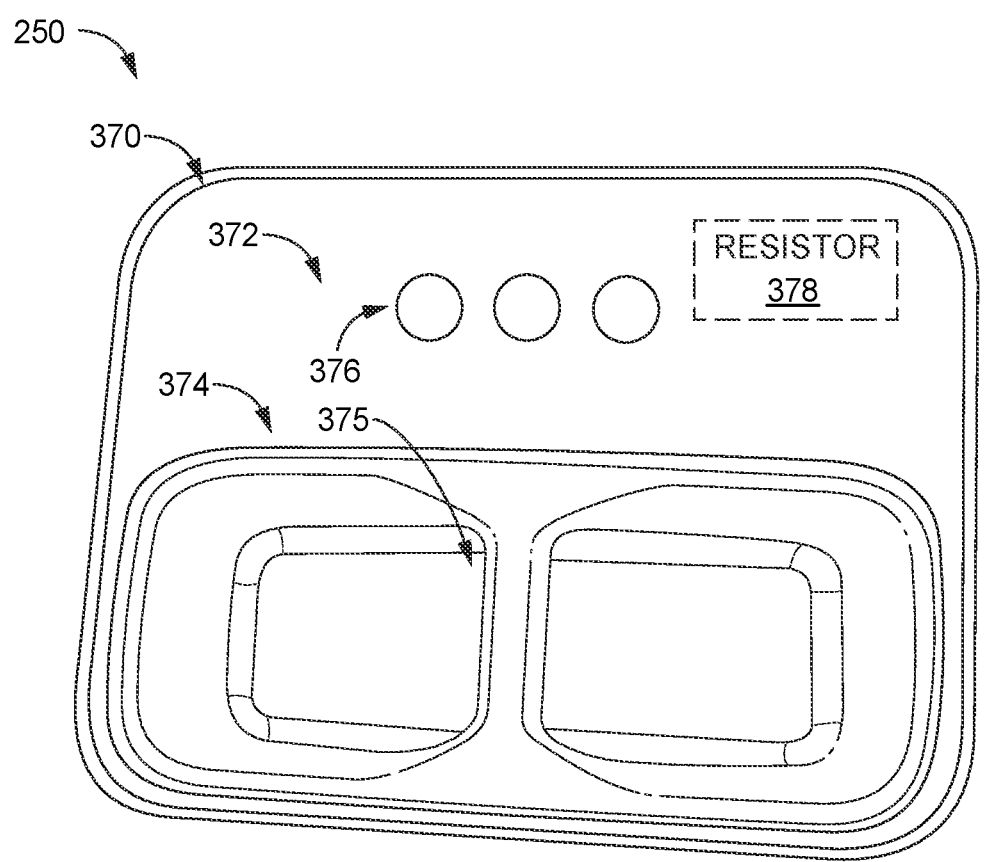
FIG. 3B illustrates an example connection interface of an accessory, in accordance with embodiments of the present disclosure.

FIG. 3B illustrates an example of a connection interface 370 of the accessory 250 of FIG. 2, in accordance with embodiments of the present disclosure. In certain embodiments, the connection interface 370 is operable to be received by, and electrically connect to, the connection interface 340 of the dock 255 shown in FIG. 3A. Similar to the connection interface 340 of the dock 255, the connection interface 370 of the accessory 250 can include an electrical portion 372 and a securement portion 374.

In general, the electrical portion 372 is configured to electrically connect to the dock 255 of FIGS. 2 and 3A and to receive electricity from the dock 255 (e.g., to charge and/or power the accessory 250). In the example of FIG. 3B, the electrical portion 372 includes a plurality of electrical contacts 376 and a resistor 378. The electrical contacts 376 are shown to be three in number, although it should be appreciated that two or any other suitable number may be utilized in various implementations. More generally, the position, number, and type of the electrical contacts 376 may correspond to the electrical pins 346 of FIG. 3A.

The resistor 378 is in electrical communication with at least one of the electrical contacts 376 and is operable to supply electrical resistance corresponding to a preconfigured resistance value or range of values. In certain embodiments, the preconfigured resistance value or range of values identifies the accessory 250. In various embodiments, different resistance values or ranges of values can be associated with different accessories, where the different accessories can differ in terms of model, type, capabilities, and/or the like. In these embodiments, the resistance supplied by the resistor 378 can be measured, for example, by the measurement unit 348 of FIG. 3A, and used to determine an identity of the accessory 250.

For example, one accessory, such as a storage drawer, can be associated with 1 kilo-Ohm (kΩ) of electrical resistance, while another accessory, such as a portable speaker, can be associated with 2.4 kΩ of electrical resistance. In various embodiments, a resistance range for an accessory can be defined as a tolerance relative to the associated resistance value, such as +/−1%. According to this example, if the resistor 378 is configured to supply electrical resistance of 1 kΩ or 2.4 kΩ, such resistance can be measured, for example, by the measurement unit 348 of FIG. 3A, and used by a control system to identify the accessory 250 as a storage drawer or a portable speaker, respectively. The identification can be based on, for example, the measured resistance from the measurement unit 348 falling within the resistance range associated with a storage drawer (e.g., 1 kΩ+/−1%, or 990Ω to 1.01 kΩ), the resistance range associated with a portable speaker (e.g., 2.4 kΩ+/−1%, or 2.376 kΩ to 2.424 kΩ), or the like. In various embodiments, two, three, four, five, or any other suitable number of accessories can be similarly associated with resistance values or ranges of values and identified in like fashion. In certain embodiments, accessory-specific vehicle program logic can be executed based on the determined identity, as discussed in further detail below.

In the illustrated embodiment, the securement portion 374 of the connection interface 370 is configured in correspondence to the securement portion 344 of the connection interface 340. For example, the securement portion 374 can include a latch 375 that is configured to be received into, and selectively secured by, the lock 345 of FIG. 3A. In general, when the lock 345 is in the locked state, the lock 345 secures the latch 375, for example, by hooking or closing around the latch 375. Conversely, in general, when the lock 345 is in the unlocked state, the lock 345 allows removal of the accessory 250 from the dock 255, for example, by being unhooked or open relative to the latch 375.

Referring to FIGS. 3A-B collectively, when the latch 375 is received into the lock 345, the electrical pins 346 of the dock 255 are configured to align with the electrical contacts 376 of the accessory 250, thereby creating an electrical connection between the dock 255 and the accessory 250. In some cases, the electrical connection can be used to charge and/or power the accessory 250 using vehicle power. In certain embodiments, when the lock 345 is in the locked state, for example, by hooking or closing around the latch 375, the lock 345 can prevent removal or disengagement of the accessory 250 from the dock 255. In addition, or alternatively, the locked state of the lock 345 can maintain alignment of the electrical pins 346 of the dock 255 with the electrical contacts 376 of the accessory 250, thereby preventing electrical disconnection of the accessory 250 from the dock 255.

Figure 4A:
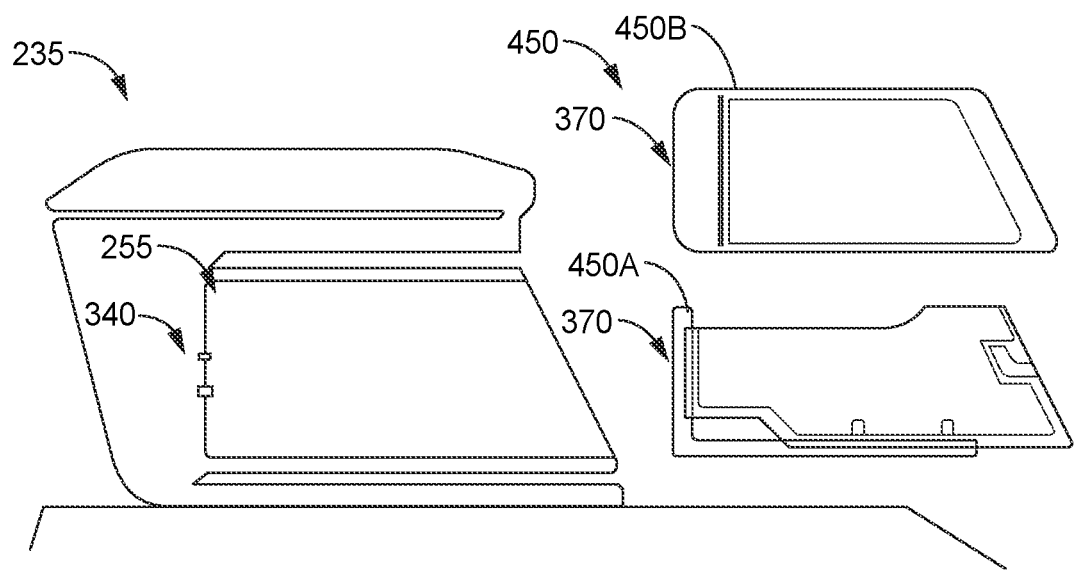
FIG. 4A illustrates an example of a dock in an empty state, in accordance with embodiments of the present disclosure.
Figure 4B:
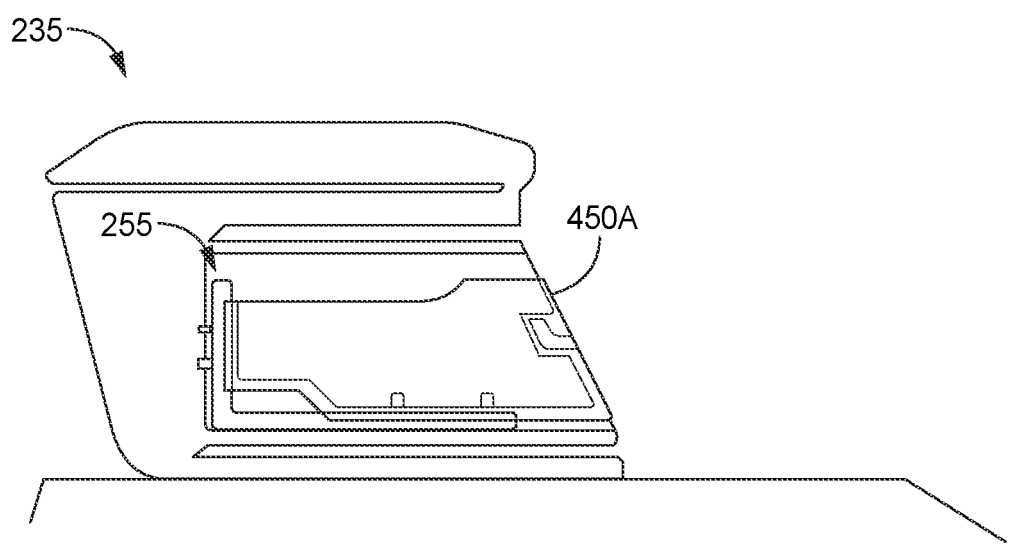
FIG. 4B illustrates an example of a dock in a docked state, in accordance with embodiments of the present disclosure.
Figure 4C:
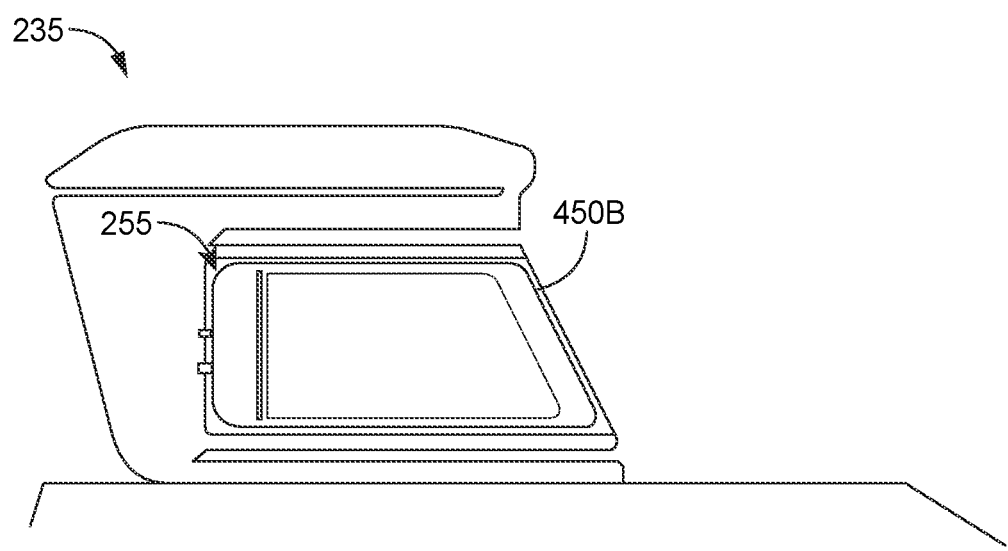
FIG. 4C illustrates an example of a dock in a docked state, in accordance with embodiments of the present disclosure.

FIGS. 4A-C are side views of the vehicle console 235 with the dock 255, in accordance with embodiments of the present disclosure. More particularly, FIGS. 4A-C show example configurations of the dock 255 relative to an example set of accessories 450. For illustrative purposes, the accessories 450 are shown to include two example accessories, namely, an accessory 450A and an accessory 450B. It should be appreciated, however, that the accessories 450 can include any suitable number and/or type of accessories for a given implementation.

With particular reference to FIG. 4A, each of the accessories 450 may have the connection interface 370 described relative to FIG. 3B, thus enabling electrical connection and securement of the accessories 450 to the connection interface 340 of the dock 255. Accordingly, the accessory 450A, for example, can be configured to supply electrical resistance corresponding to a resistance value (or range of values) that identifies the accessory 450A (e.g., 1 kΩ+/−1%, or 990Ω to 1.01 kΩ). Similarly, the accessory 450B can be configured to supply electrical resistance corresponding to a resistance value (or range of values) that identifies the accessory 450B (e.g., 2.4 kΩ+/−1%, or 2.376 kΩ to 2.424 kΩ). For each accessory, the resistance value (or range of values) can be sufficient to identify the accessory, for example, by model (e.g., the resistance value or range is unique to a manufacturer model number), accessory type (e.g., the resistance value is unique to storage drawers or speakers), accessory capabilities (e.g., the resistance value is indicative of whether the accessory is chargeable, whether the accessory is capable of wireless communication, etc.), combinations of the foregoing and/or the like.

FIG. 4A shows an example of the dock 255 in an empty state. FIG. 4B shows the dock 255 in a docked state with the accessory 450A electrically connected thereto. FIG. 4C shows the dock 255 in a docked state with the accessory 450B electrically connected thereto.

Figure 5:
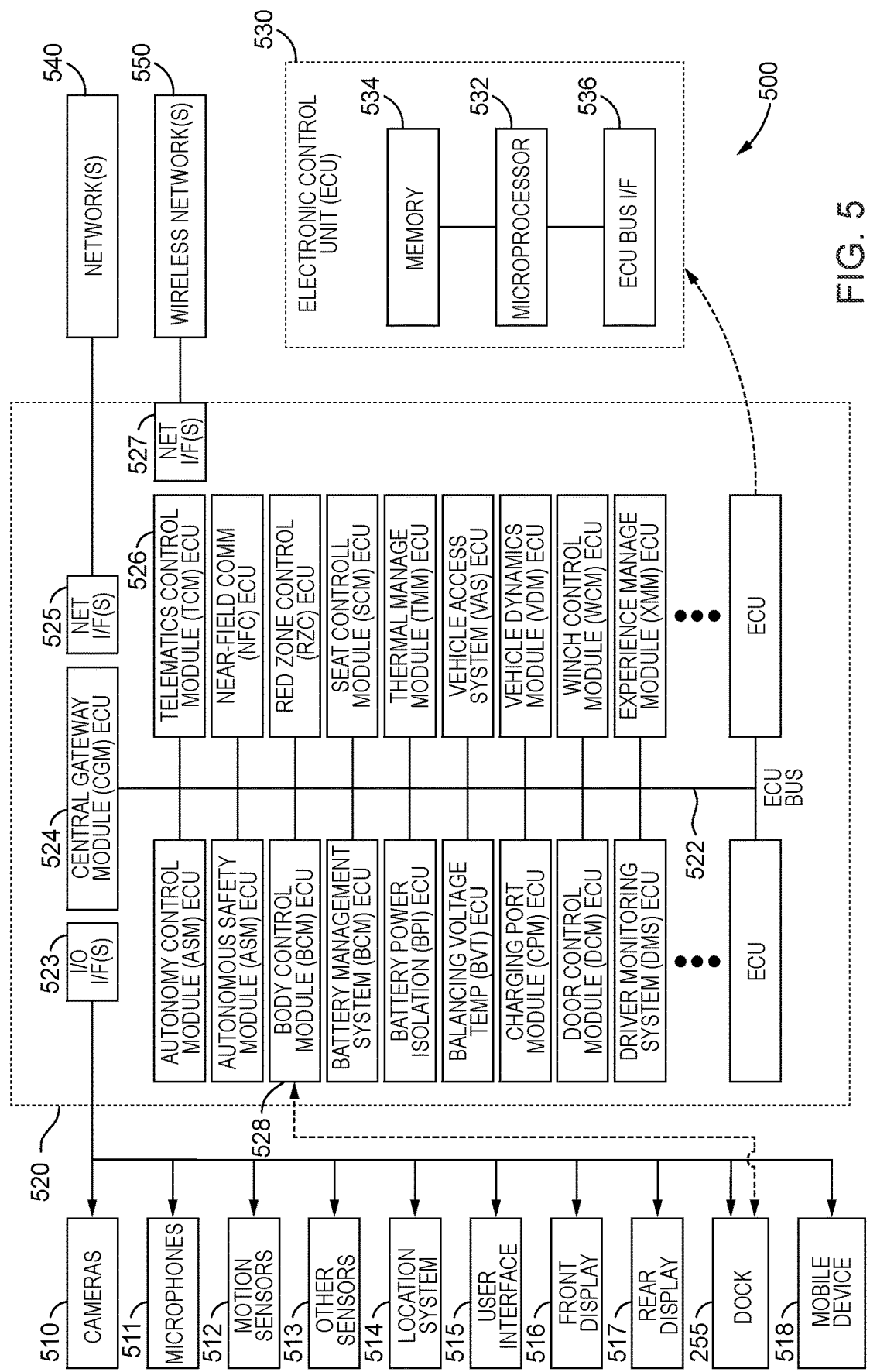
FIG. 5 illustrates example components of the example electric vehicle, in accordance with embodiments of the present disclosure.

FIG. 5 illustrates a block diagram 500 of example components of electric vehicle 100, in accordance with embodiments of the present disclosure. Generally, electric vehicle 100 includes control system 520 that is configured to perform the functions necessary to operate electric vehicle 100. In many embodiments, control system 520 includes a number of electronic control units (ECUs) 530 coupled to ECU Bus 522. Each ECU 530 performs a particular set of functions, and includes, inter alia, microprocessor 532 coupled to memory 534 and ECU Bus I/F 536. In certain embodiments, control system 520 may include one or more system-on-chips (SOCs). Each SOC may include a number of multi-core processors coupled to a high-speed interconnect and on-chip memory, and may perform a much larger set of functions that a single ECU 530.

Control system 520 is coupled to sensors, input/output (I/O) devices and actuators, as well as other components within the propulsion system, the energy storage system, and the accessory system. The sensors may include, for example, cameras 510, microphones 511, motion sensors 512, other sensors 513, location system 514, etc. The I/O devices may include, for example, user interface 515, front display 516, rear display 517, mobile device 518, etc. The actuators may include, for example, dock 255, etc. Additionally, control system 520 may be coupled to network(s) 540, network(s) 550, etc.

In certain embodiments, one or more ECUs 530 may include the necessary interfaces to be coupled directly to particular sensors, I/O devices, actuators and other vehicle system components. For example, body control module (BCM) ECU 528 may be directly connected to dock 255 (e.g., the lock 345, the measurement unit 348, the electrical pins 346, etc.), as indicated by the dashed line in FIG. 5.

In many embodiments, control system 520 includes Central Gateway Module (CGM) ECU 524 which provides a central communications hub for electric vehicle 100. CGM ECU 524 includes (or is coupled to) I/O interfaces 523 to receive data, send commands, etc., to and from the sensors, I/O devices, actuators and other vehicle system components. CGM ECU 524 also includes (or is coupled to) network interface(s) 525 that provides network connectivity through Controller Area Network (CAN) ports, Local Interconnect Network (LIN) ports, Ethernet ports, etc.

For example, CGM ECU 524 may receive data from cameras 510, microphones 511, motion sensor 512, other sensors 513 and location system 514, as well as user interface 515, and then communicate the data over ECU Bus 522 to the appropriate ECU 530. Similarly, CGM ECU 524 may receive commands and data from the ECUs 530 and send them to the appropriate I/O devices, actuators and vehicle components. For example, a GUI widget may be sent to user interface 515 (e.g., a touchscreen front display 516, rear display 517, and/or mobile device 518), video data from cameras 510 may be sent to front display 516, rear display 517, mobile device 518 etc. Additionally, CGM ECU 524 may also serve as a master control over the different vehicle modes (e.g., road driving mode, parked mode, off-roading mode, tow mode, camping mode), and thereby control certain vehicle components related to placing the vehicle in one of the vehicle modes.

In many embodiments, control system 520 includes Telematics Control Module (TCM) ECU 526 which provides a vehicle communication gateway for electric vehicle 100. TCM ECU 526 includes (or is coupled to) network interface(s) 527 that provides network connectivity to support functionality such as over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), automated calling functionality, etc.

In many embodiments, control system 520 also includes, inter alia, Autonomy Control Module (ACM) ECU, Autonomous Safety Module (ASM) ECU, Body Control Module (BCM) ECU, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS) ECU, Vehicle Dynamics Module (VDM) ECU, Winch Control Module (WCM) ECU, an Experience Management Module (XMM) ECU, etc. In certain embodiments, the XMM ECU may transmit data to the TCM ECU 526 via Ethernet. Additionally or alternatively, the XMM ECU may transmit other data (e.g., sound data from microphones 511, etc.) to the TCM ECU 526.

In certain embodiments, the BCM ECU 528 may control operation of the dock 255. For example, the BCM ECU 528 can monitor the dock 255 for an accessory received therein, for example, as evidenced by a resistance value received from the measurement unit 348 of the dock 255. Based on the resistance value, the BCM ECU 528 can identify the accessory as described relative to FIGS. 3A-B and 4A-C. In various embodiments, the BCM ECU 528 can include tively. In addition, or alternatively, the BCM ECU 528 can cause selection of such unavailable options to be automatically rejected.

TABLE 1

| GEAR STATE | DOCK STATE | DEFAULT LOCK STATE | IS DOCK LOCKABLE? | IS DOCK UNLOCKABLE? |
|---|---|---|---|---|
| PARKED | SPEAKER IN DOCK | UNLOCKED | YES | YES |
| PARKED | EMPTY | UNLOCKED | NO; DOCK AUTMATICALLY UNLOCKED; DOCK REMAINS IN UNLOCKED STATE. | YES |
| NOT PARKED (e.g., reverse, neutral or drive) | SPEAKER IN DOCK | LOCKED | NO; DOCK AUTOMATICALLY LOCKED; DOCK REMAINS IN LOCKED STATE. | NO; DOCK AUTOMATICALLY LOCKED; DOCK REMAINS IN LOCKED STATE. |
| NOT PARKED (e.g., reverse, neutral or drive) | EMPTY | UNLOCKED | NO; DOCK AUTOMATICALLY UNLOCKED; DOCK REMAINS IN UNLOCKED STATE. | YES |
| NOT PARKED (e.g., reverse, neutral or drive) | SPEAKER IN DOCK | LOCKED | NO; DOCK AUTOMATICALLY LOCKED; DOCK REMAINS IN LOCKED STATE. | NO; DOCK AUTOMATICALLY LOCKED; DOCK REMAINS IN LOCKED STATE. | programming or configurations, for example, in memory 534, that map resistance values or ranges of values to identities of accessories (e.g., by model, type, or capabilities as described previously).

In various embodiments, the BCM ECU 528 can execute vehicle program logic based on the identity of the accessory in the dock 255 and/or any conditions of the electric vehicle 100. For example, the vehicle program logic can identify one or more conditions under which the lock 345 is in a locked state, or an unlocked state, based on the identity of the accessory. The conditions of the electric vehicle 100 can include, for example, gear states (e.g., parked, reverse, neutral, drive, etc.), dock states (e.g., empty, speaker in dock, storage drawer in dock, refrigerator in dock, etc.), and/or the like. In certain embodiments, the BCM ECU 528 can update, or cause another of the ECUs 530 to update, the user interface 515 (e.g., the front display 516, the rear display 517, and/or the mobile device 518) when the state of the dock 255 and/or the lock 345 changes.

Table 1 below illustrates an example of a state machine for the dock 255 with particular focus on the lock 345 of FIG. 3A and the accessory 450B of FIGS. 4A and 4C, which accessory may be a portable speaker as described previously. In various embodiments, as shown in the example of Table 1, the BCM ECU 528 can cause the lock 345 of the dock 255 to automatically enter a default lock state upon detection of a defined condition or combination of conditions (e.g., gear state and dock state). Thereafter, according to the example of Table 1, the dock 255 can be lockable and/or unlockable (i.e., the lock 345 is permitted to move to a locked state or unlocked state) in response to user commands via the user interface 515, for example. In some embodiments, the BCM ECU 528 can cause the user interface 515, for example, to hide toggles or user interface components corresponding to unavailable options, such as commands to lock or unlock when the dock 255 is not lockable or unlockable, respectively. In addition, or alternatively, the BCM ECU 528 can cause selection of such unavailable options to be automatically rejected.

In various embodiments, the BCM ECU 528 can implement different vehicle program logic based on the identity of the accessory in the dock. For example, the BCM ECU 528 can determine whether the accessory supports wireless communication. If the BCM ECU 528 determines that the accessory supports wireless communication, the BCM ECU 528 can interact with other ECUs 530, such as the XMM ECU or another ECU, to establish a wireless connection with the accessory. In various embodiments, the accessory can supply, over the wireless connection, accessory-specific information for the user interface 515. For example, if the accessory is the accessory 450B of FIGS. 4A and 4C (i.e., a portable speaker), the accessory-specific information can include, for example, a battery level, a volume, or the like. In contrast, if the BCM ECU 528 determines that the accessory does not support wireless communication, as may be the case with the accessory 450A (i.e., a storage drawer), the BCM ECU 528 may not perform the foregoing functionality related to wireless communication.

As another example of different vehicle program logic based on the identity of the accessory in the dock, the BCM ECU 528 can determine whether the accessory is chargeable, for example, as a result of the accessory including a rechargeable battery. If the accessory is determined to be chargeable, the BCM ECU 528 can enable charging functionality of the dock 255. Otherwise, if the BCM ECU 528 determines that the accessory is not chargeable, the BCM ECU 528 can disable charging functionality of the dock 255. In an example, if the accessory is the accessory 450B of FIGS. 4A and 4C (i.e., a portable speaker), the BCM ECU 528 can determine that the accessory 450B is chargeable and enable charging functionality of the dock 255. In another example, if the accessory is the accessory 450A of FIGS. 4A and 4B (i.e., a storage drawer), the BCM ECU 528 can disable charging functionality of the dock 255. Example operation of the BCM ECU 528 will be described in greater detail relative to FIGS. 6A-B, 7A-G, and 8-9.

Figure 6A:
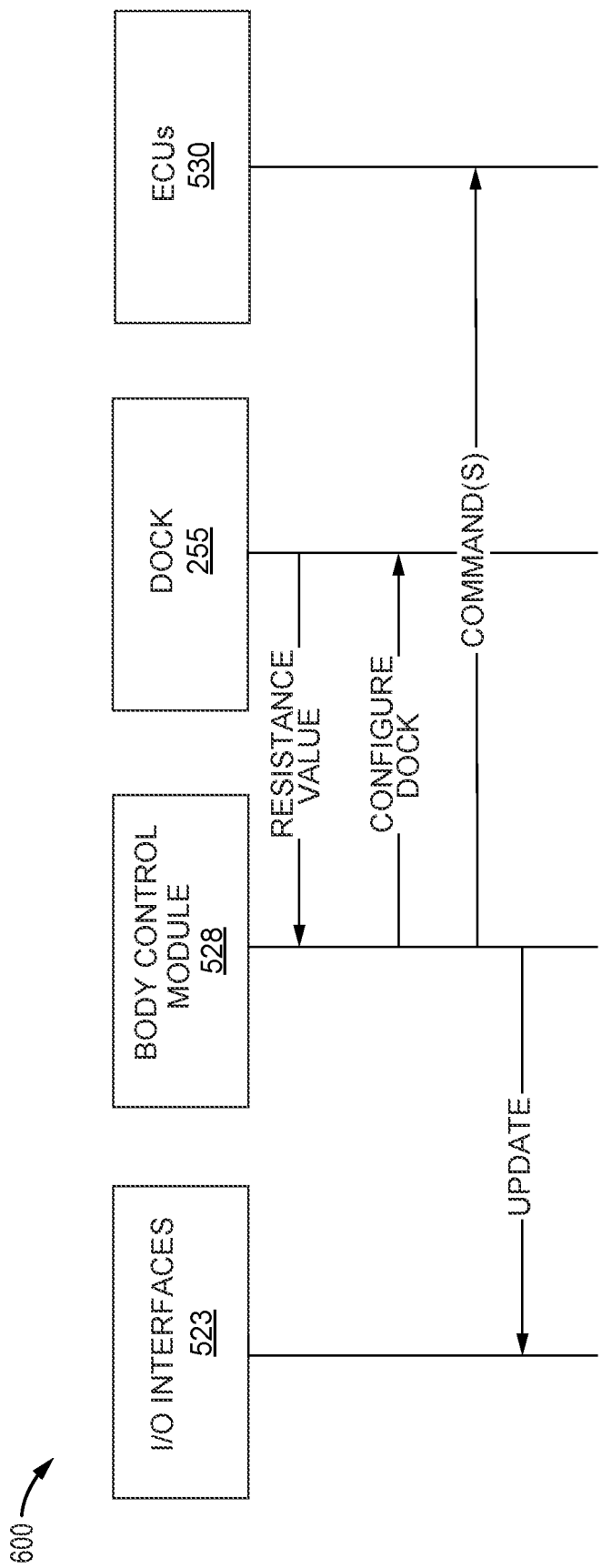
FIG. 6A illustrates an example of a sequence diagram for receiving and acting on information received from a dock, in accordance with embodiments of the present disclosure.

FIG. 6A illustrates an example of a sequence diagram 600 for receiving and acting on information received from the dock 255, in accordance with embodiments of the present disclosure. Generally, the sequence diagram 600 depicts the BCM ECU 528, the I/O interfaces 523, the dock 255, and other ECUs 530.

The BCM ECU 528 can receive a resistance value, for example, from the dock 255 (e.g., via the measurement unit 348 of FIG. 3A). If the resistance value is minimal or otherwise indicative of nothing being in the dock 255, the dock 255 can be determined to be in an empty state. Otherwise, the BCM ECU 528 can identify an accessory in the dock 255 based on the resistance value as described previously. Thereafter, the BCM ECU 528 can configure the dock 255 based on the identity of the accessory and/or other conditions. For example, the BCM ECU 528 can cause the lock 345 to automatically enter a locked state or an unlocked state as described previously, enable or disable charging functionality of the dock 255 as described previously, and/or the like.

In addition, or alternatively, based on the identity of the accessory and/or other conditions, the BCM ECU 528 can send commands to other ECUs 530, such as the XMM ECU, to control or manipulate other vehicle features based on the input. For example, the BCM ECU 528 can determine whether the accessory supports wireless communication, and if so, cause wireless communication to be initiated or established with the accessory as described previously. The BCM ECU 528 can send a command to the I/O interfaces 523, for example, to cause the user interface 515 to be updated in response to the identity of the accessory, the dock configuration, and/or the commands to other ECUs 530.

Figure 6B:
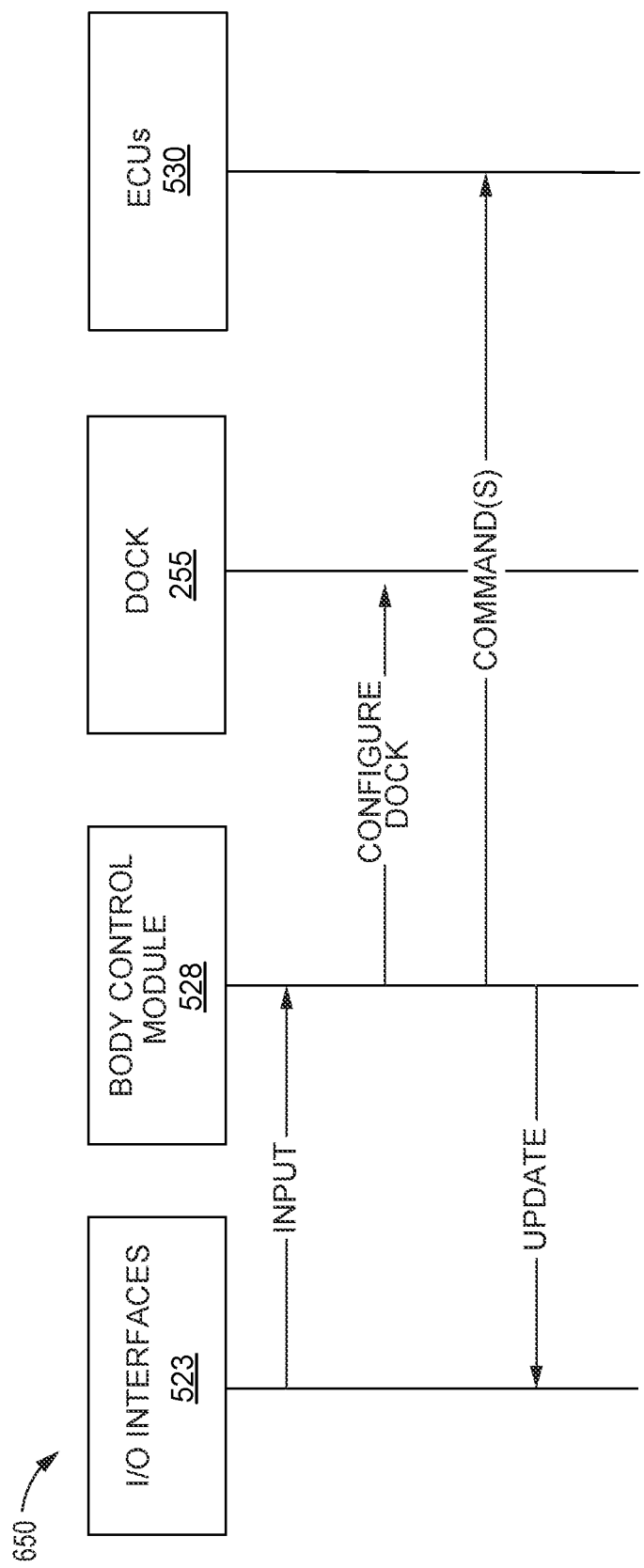
FIG. 6B illustrates an example of a sequence diagram for receiving and acting on input, in accordance with embodiments of the present disclosure.

FIG. 6B illustrates an example of a sequence diagram 650 for receiving and acting on input, in accordance with embodiments of the present disclosure. Generally, the sequence diagram 600 depicts the BCM ECU 528, the I/O interfaces 523, the dock 255, and other ECUs 530.

The BCM ECU 528 can receive input from the I/O interfaces 523. In some cases, the input from the I/O interfaces 523 can be an identification or detection of a condition such as, for example, a gear state (e.g., park, reverse, neutral, or drive). In addition, or alternatively, the input from the I/O interfaces 523 may be user input that originates, for example, from the user interface 515 and/or the like. In an example, the user input may be, for example, a command to undock an accessory in the dock 255, such that the command amounts to a command to cause the lock 345 to move to the unlocked state. In another example, the user input may be, for example, a command to lock an accessory in the dock 255, such that the command amounts to a command to cause the lock 345 to move to the locked state.

In response to the input, the BCM ECU 528, configures the dock, for example, by causing the lock 345 to move to the locked state or unlocked state, for example, in accordance with a command or a detected condition. In some cases, such as when the input is a command to lock or unlock the dock 255 at a time when such option is unavailable, the BCM ECU 528 can reject or ignore the input. In addition, or alternatively, in response to the input and/or the configuration of the dock 255, the BCM ECU 528 can send commands to other ECUs 530, such as the XMM ECU, to control or manipulate other vehicle features based on the input. The BCM ECU 528 can send a command to the I/O interfaces 523, for example, to cause the user interface 515 to be updated in response to the input, the dock configuration, and/or the commands to other ECUs 530.

FIGS. 7A-G illustrate example user interface views that can be presented, for example, via the user interface 515 (e.g., on the front display 516, the rear display 517 and/or the mobile device 518), in accordance with embodiments of the present disclosure.

Figure 7A:
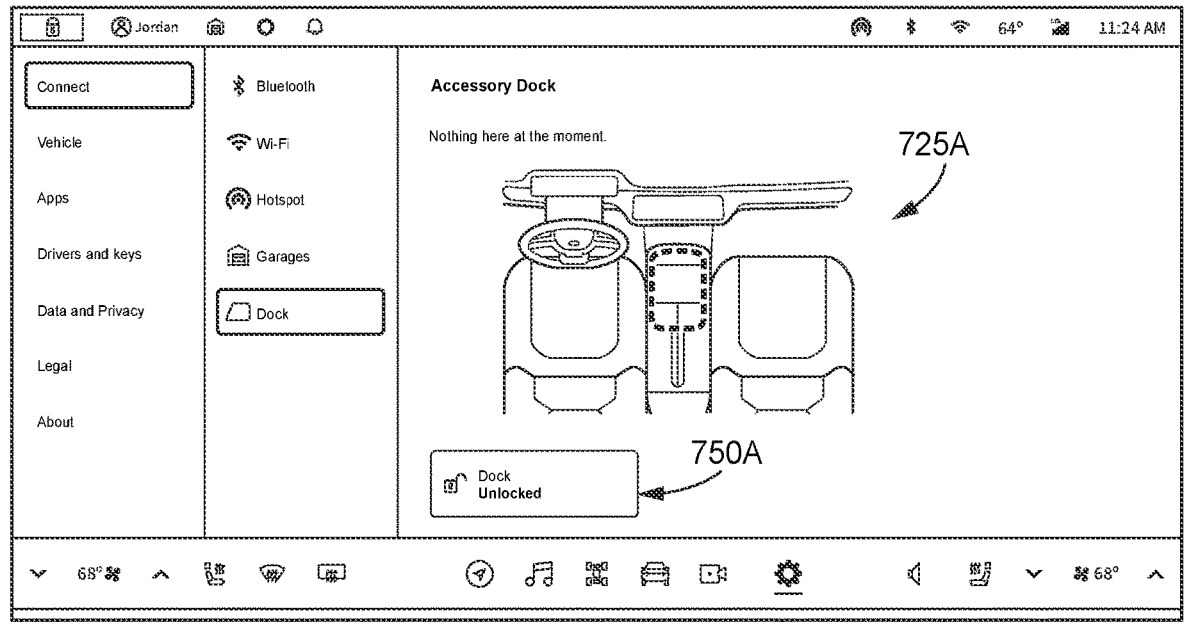
FIGS. 7A-G illustrate example user interface views that may be presented on a user interface, in accordance with embodiments of the present disclosure.

FIG. 7A illustrates an example of a user interface view 700A that can be presented in response to the dock 255 being in, or entering, an empty state, for example, as described relative to FIG. 4A. In various embodiments, as described relative to FIG. 6A, the BCM ECU 528 can send a command to the I/O interfaces 523, for example, to cause the user interface 515 to be updated in response to a determination that nothing is in the dock 255 and/or in response to any resulting configuration of the dock 255 (e.g., causing the lock 345 to enter a locked or unlocked state). In various embodiments, the user interface view 700A may be presented on the user interface 515 (e.g., on the front display 516, the rear display 517 and/or the mobile device 518) in response to the command from the BCM ECU 528. In the example of FIG. 7A, the user interface view 700A includes a graphical depiction 725A showing that the dock 255 is empty. The user interface view 700A further includes a graphical indication 750A showing that the lock 345 of the dock 255 is in the unlocked state.

Figure 7B:
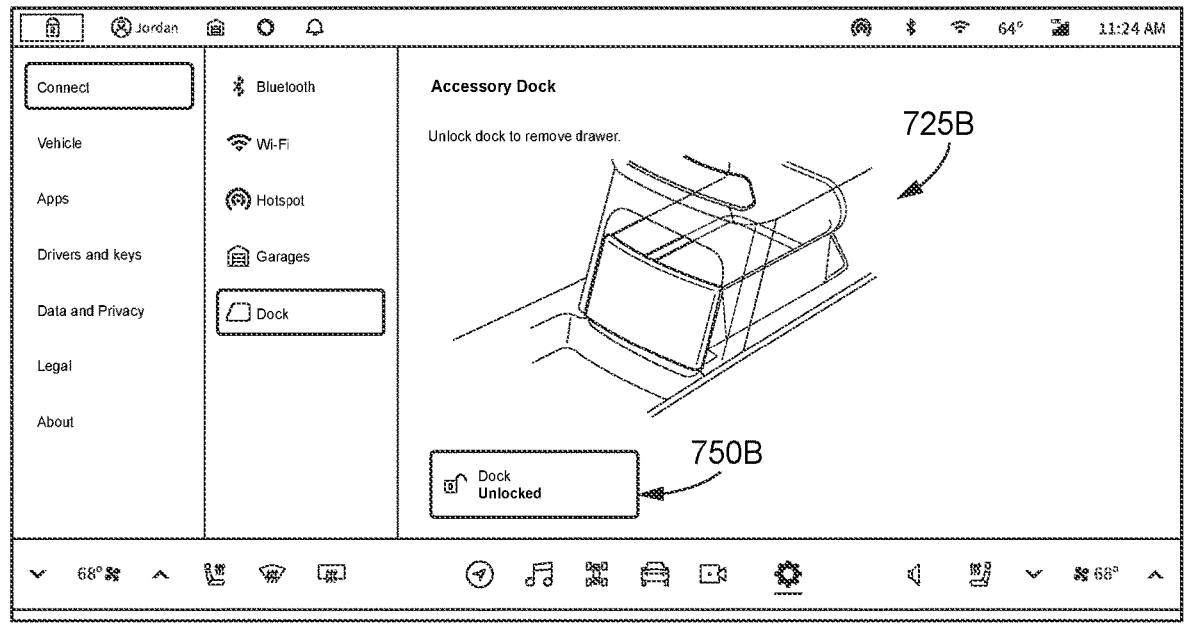

FIG. 7B illustrates an example of a user interface view 700B that can be presented, for example, when the dock 255 in a docked state with an accessory similar to the accessory 450A of FIGS. 4A-B (i.e., a storage drawer) received therein and electrically connected thereto. As described relative to FIGS. 2, 3A-B, 4A-C, 5 and 6A, the BCM ECU 528 can identify the accessory based on its configured resistance value. As described relative to FIG. 6A, the BCM ECU 528 can send a command to the I/O interfaces 523, for example, to cause the user interface 515 to be updated in response to the identity of the accessory, any resulting dock configuration, and/or any commands to other ECUs 530. In the example of FIG. 7B, the user interface view 700B includes a graphical depiction 725B showing the accessory in the dock 255. The user interface view 700B further includes a graphical indication 750B showing that the lock 345 of the dock 255 is in the locked state.

Figure 7C:
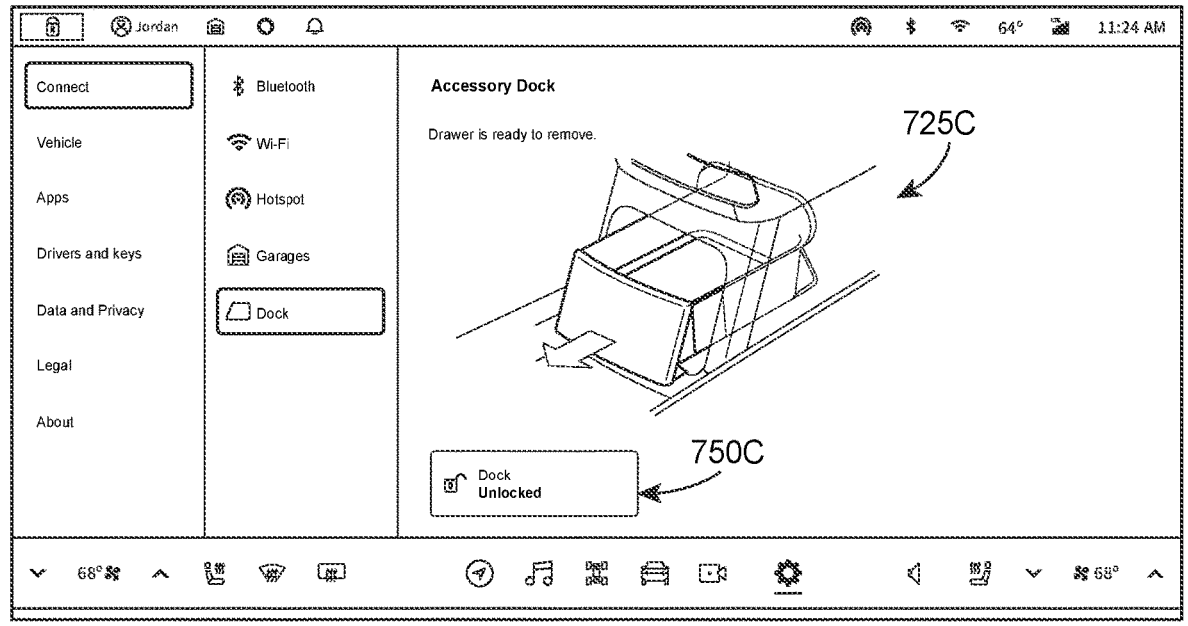

FIG. 7C illustrates an example of a user interface view 700C that can be presented, for example, when the dock 255 is in the docked state described relative to FIG. 7B and an unlock command is subsequently received. The BCM ECU 528 can receive the lock command, for example, as user input as described relative to FIG. 6B. The lock command can be a result, for example, of a user tapping or otherwise acting on the graphical indication 750B of FIG. 7B. In the example of FIG. 7C, the user interface view 700C includes a graphical depiction 725C showing an accessory similar to the accessory 450A of FIGS. 4A-B (i.e., a storage drawer) being removed from the dock 255. The user interface view 700B further includes a graphical indication 750C showing that the lock 345 of the dock 255 is in the unlocked state, thereby informing the user that the accessory may be removed from the dock 255.

Figure 7D:
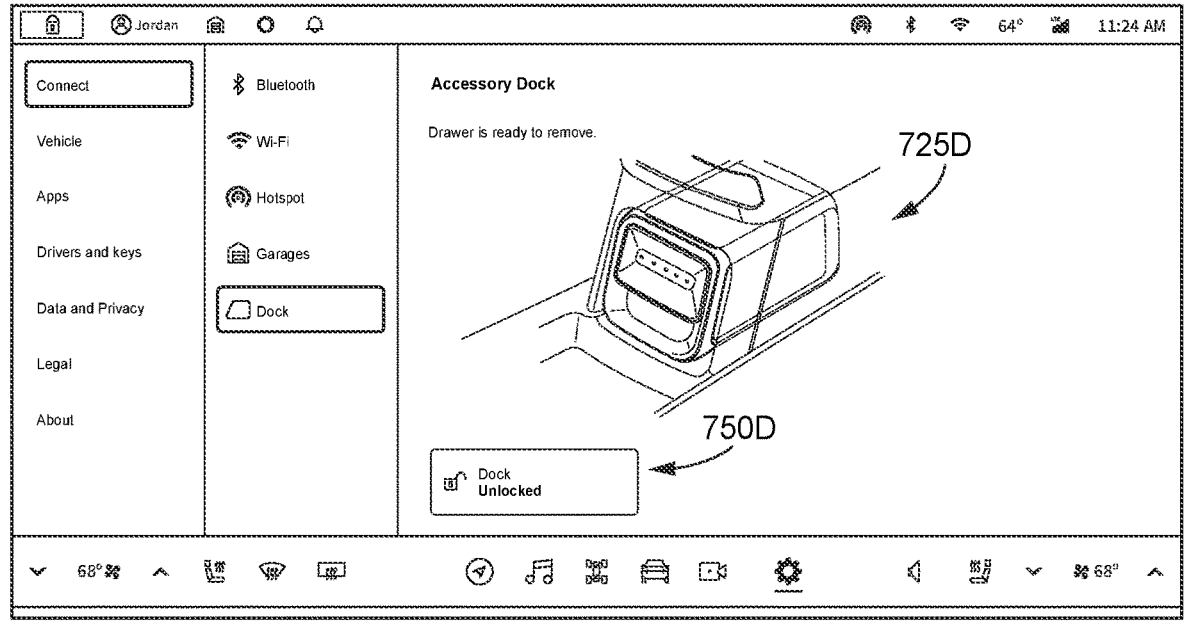

FIG. 7D illustrates an example of a user interface view 700D that can be presented, for example, when the dock 255 in a docked state with an accessory similar to the accessory 450B of FIGS. 4A and C (i.e., a portable speaker) received therein and electrically connected thereto. As described relative to FIGS. 2, 3A-B 4A-C and 6A, the BCM ECU 528 can identify the accessory based on its configured resistance value. As described relative to FIG. 6A, the BCM ECU 528 can send a command to the I/O interfaces 523, for example, to cause the user interface 515 to be updated in response to the identity of the accessory, any resulting dock configuration, and/or any commands to other ECUs 530. In the example of FIG. 7B, the user interface view 700C includes a graphical depiction 725C showing the accessory in the dock 255. The user interface view 700C further includes a graphical indication 750C showing that the lock 345 of the dock 255 is in the unlocked state.

Figure 7E:
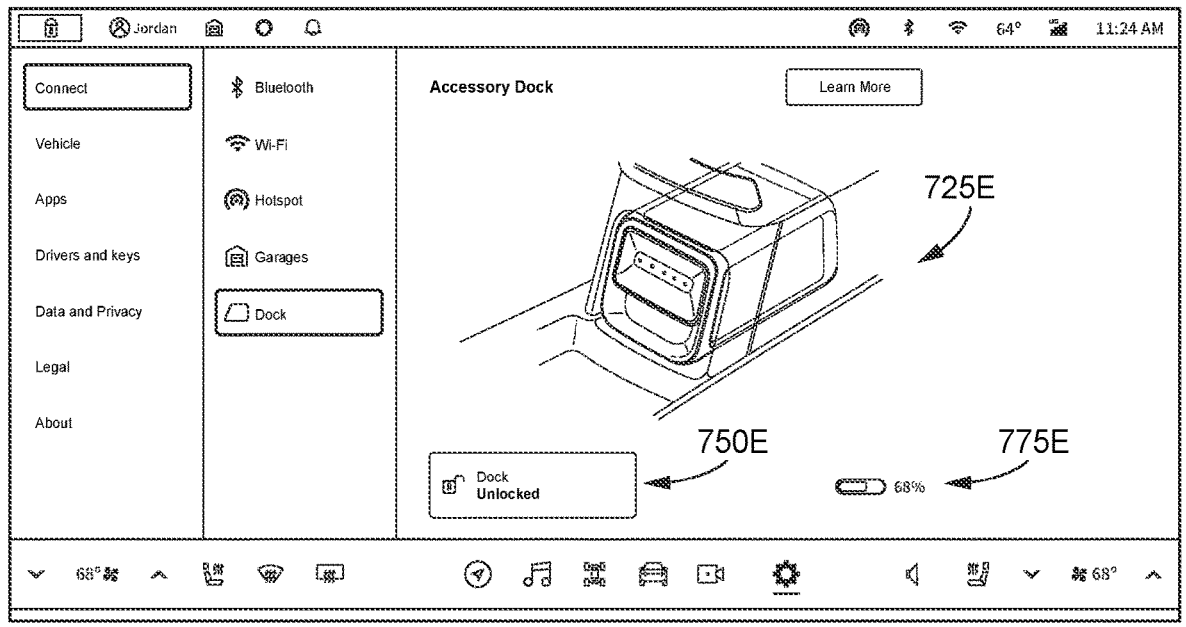

FIG. 7E illustrates an example of a user interface view 700E that can be presented, for example, when the dock 255 is in the docked state described relative to FIG. 7D, such that an accessory similar to the accessory 450B of FIGS. 4A and C (i.e., a portable speaker) is received therein and electrically connected thereto. The user interface view 700E includes a graphical depiction 725E and a graphical indication 750E that generally correspond to the graphical depiction 725D and the graphical indication 750D, respectively, shown in FIG. 7D. In addition, the user interface view 700E includes a graphical battery-level indication 775E.

Still referring to FIG. 7E, as described relative to FIGS. 5 and 6A, if the accessory is determined to be chargeable, the BCM ECU 528 can enable charging functionality of the dock 255. As also described relative to FIGS. 5 and 6A, if the BCM ECU 528 determines that the accessory supports wireless communication, the BCM ECU 528 can interact with other ECUs 530, such as the XMM ECU or another ECU, to establish a wireless connection with the accessory, for example, for purposes of receiving accessory-specific information. In the example of FIG. 7E, charging functionality is enabled and a wireless connection with the accessory is established, with the graphical battery-level indication 775E evidencing a battery level having been received over the wireless connection as accessory-specific information.

Figure 7F:
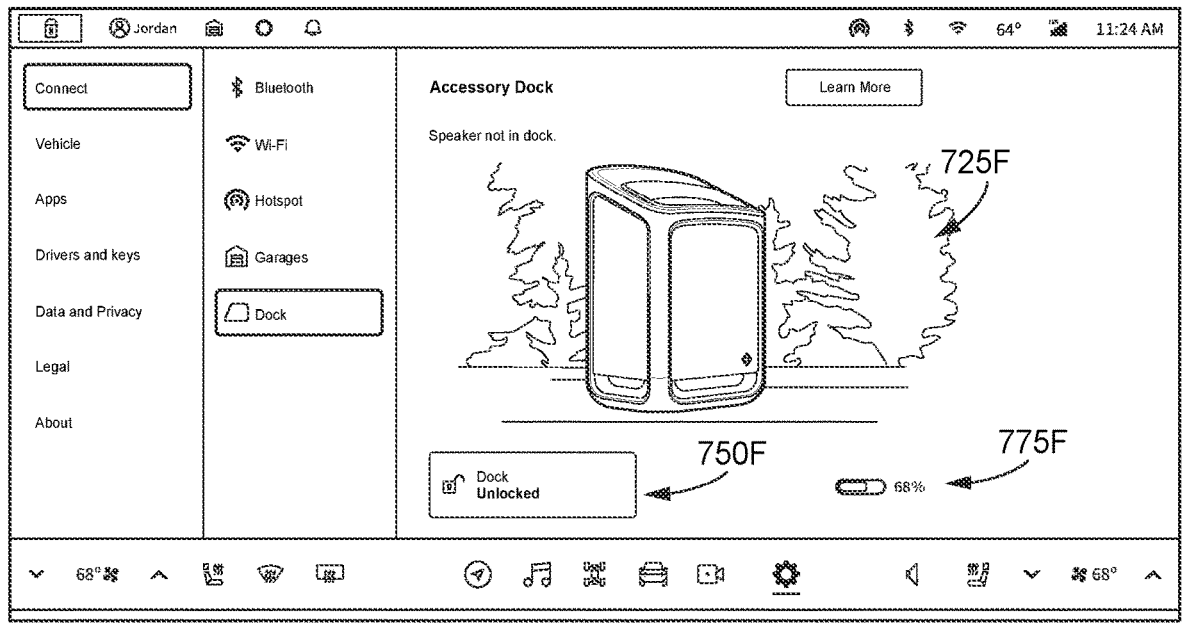

FIG. 7F illustrates an example of a user interface view 700F that can be presented, for example, when an accessory similar to the accessory 450B of FIGS. 4A and 4C (i.e., a portable speaker) is not in the dock 255 but is in wireless communication, for example, with one of the ECUs 530 such as the XMM ECU as described previously. The user interface view 700F includes a graphical depiction 725F showing the accessory individually (i.e., without the dock 255), a graphical indication 750F showing that the lock 345 of the dock 255 is in the unlocked state, and a graphical battery-level indication 775F that generally corresponds to the graphical battery-level indication 775E of FIG. 7E. In some embodiments, the user interface view 700F can be presented in response to and/or following removal of the accessory from the dock.

Figure 7G:
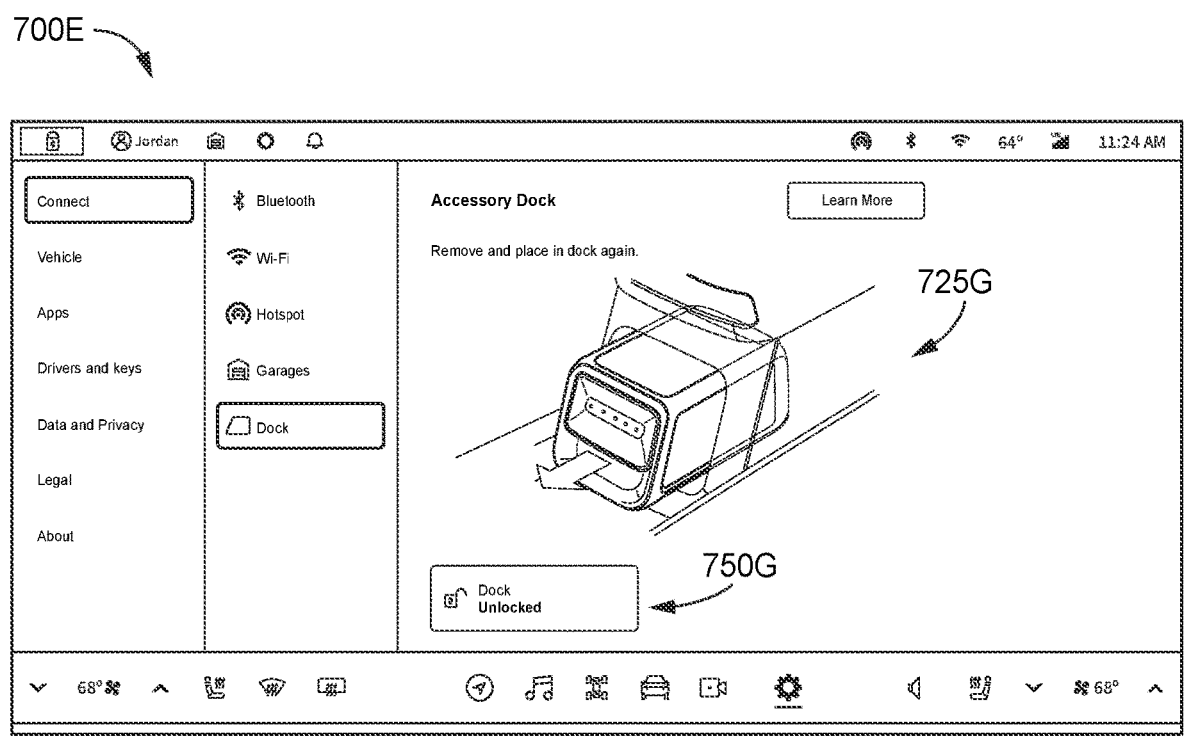

FIG. 7G illustrates an example of a user interface view 700G that can be presented, for example, upon the occurrence of an exception or error relative to docking an accessory in the dock 255. In some examples, the error or exception can relate to an error in charging or wirelessly communicating with the accessory. The user interface view 700G includes a graphical depiction 725G and a graphical indication 750G that generally correspond to the graphical depiction 725D and the graphical indication 750D, respectively, shown in FIG. 7D. In addition, the user interface view 700E instructs a user to remove and replace the accessory.

Figure 8:
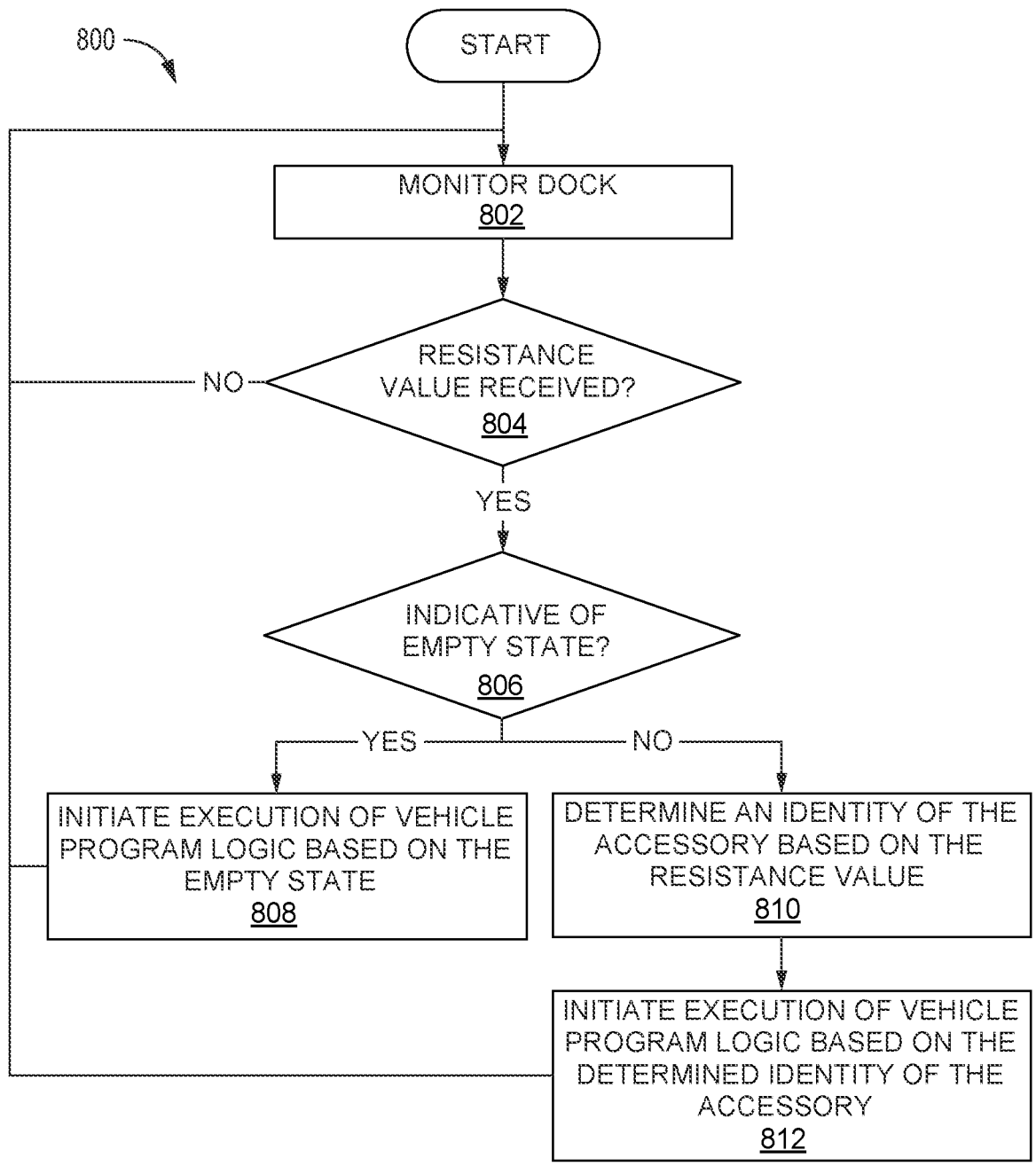
FIG. 8 illustrates an example of a process for adaptive accessory control in a vehicle, in accordance with embodiments of the present disclosure.

FIG. 8 illustrates an example of a process 800 for adaptive accessory control in a vehicle such as the electrical vehicle 100 of FIG. 1, in accordance with embodiments of the present disclosure. In certain embodiments, the process 800 can be implemented by any vehicle system that can process data. Although any number of systems, in whole or in part, can implement the process 800, to simplify discussion, the process 800 will be described in relation to the dock 255 of FIGS. 2, 3A, 4A-C, 5, and 6A-B and the BCM ECU 528 of FIGS. 5 and 6A-B.

At block 802, the BCM ECU 528 monitors the dock 255 for resistance values. The BCM ECU 528 can receive resistance values from the measurement unit 348 of the dock 255 as described relative to FIG. 3A. At decision block 804, the BCM ECU 528 determines whether a resistance value has been received. If the BCM ECU 528 determines that no resistance value has been received, the process 800 returns to the block 802 and executes as described previously. Otherwise, if it is determined at the decision block 804 that a resistance value has been received, the process 800 proceeds to decision block 806.

At decision block 806, the BCM ECU 528 determines whether the resistance value is associated with an empty state of the dock 255. In certain embodiments, the resistance value may be associated with an empty state of the dock 255 if it is minimal or otherwise indicative of nothing being in the dock 255. If it is determined at the decision block 806 that the resistance value is associated with an empty state of the dock 255, the process 800 proceeds to block 808. At block 808, the BCM ECU 528 initiates execution of vehicle program logic based on the empty state. The execution can include, for example, presenting, or causing presentation of, a user interface view similar to the user interface view 700A of FIG. 7A. In addition, or alternatively, the execution can include performing, or causing performance of, any of the functionality described relative to the user interface view 700A.

If it is determined at the decision block 806 that the resistance value is not associated with an empty state of the dock 255, the process 800 proceeds to block 810. In general, if the resistance value is not associated with an empty state of the dock 255, such value can be considered to be associated with an accessory electrically connected to the dock 255 via the connection interface 340.

At block 810, the BCM ECU 528 determines an identity of the accessory based on the resistance value. As described previously, each accessory designed for use with the dock 255 can include a resistor operable to supply electrical resistance corresponding to a preconfigured resistance value or range of values, where the preconfigured resistance value or range of values identifies the accessory. In various embodiments, the BCM ECU 528 can include programming or configurations, for example, in memory 534, that map resistance values or ranges of values to identities of accessories (e.g., by model, type, or capabilities as described previously). In these embodiments, the block 810 can include the BCM ECU 528 mapping the received resistance value to one of the identities, where the value or range of values corresponds to an accessory model, accessory type, accessory capabilities, and/or the like.

At block 812, the BCM ECU 528 initiates execution of vehicle program logic based on the determined identity of the accessory. In some embodiments, the vehicle program logic identifies one or more conditions under which the lock 345 is in a locked state, or an unlocked state, based on the determined identity of the accessory. For example, the block 812 can include responding to conditions in a way that is dependent, at least in part, on the determined identity of the accessory as described relative to FIG. 5 and Table 1.

In addition, or alternatively, the block 812 can include presenting, or causing presentation of, user interface views similar to the user interface views 700A-G of FIGS. 7A-G. In addition, or alternatively, the execution can include performing, or causing performance of, any of the functionality described relative to the user interface views 700A-G of FIGS. 7A-G. In addition, or alternatively, the block 812 can include performing additional actions based on the capabilities of the accessory as described relative to FIGS. 5 and 6A. An example of performing additional actions based on the capabilities of the accessory will be further described relative to FIG. 9.

From block 812, the process 800 returns to the block 802 and executes as described previously. In various embodiments, the process 800 can continue until shutdown of the electric vehicle 100, until user termination, or until other suitable stop criteria is satisfied.

Figure 9:
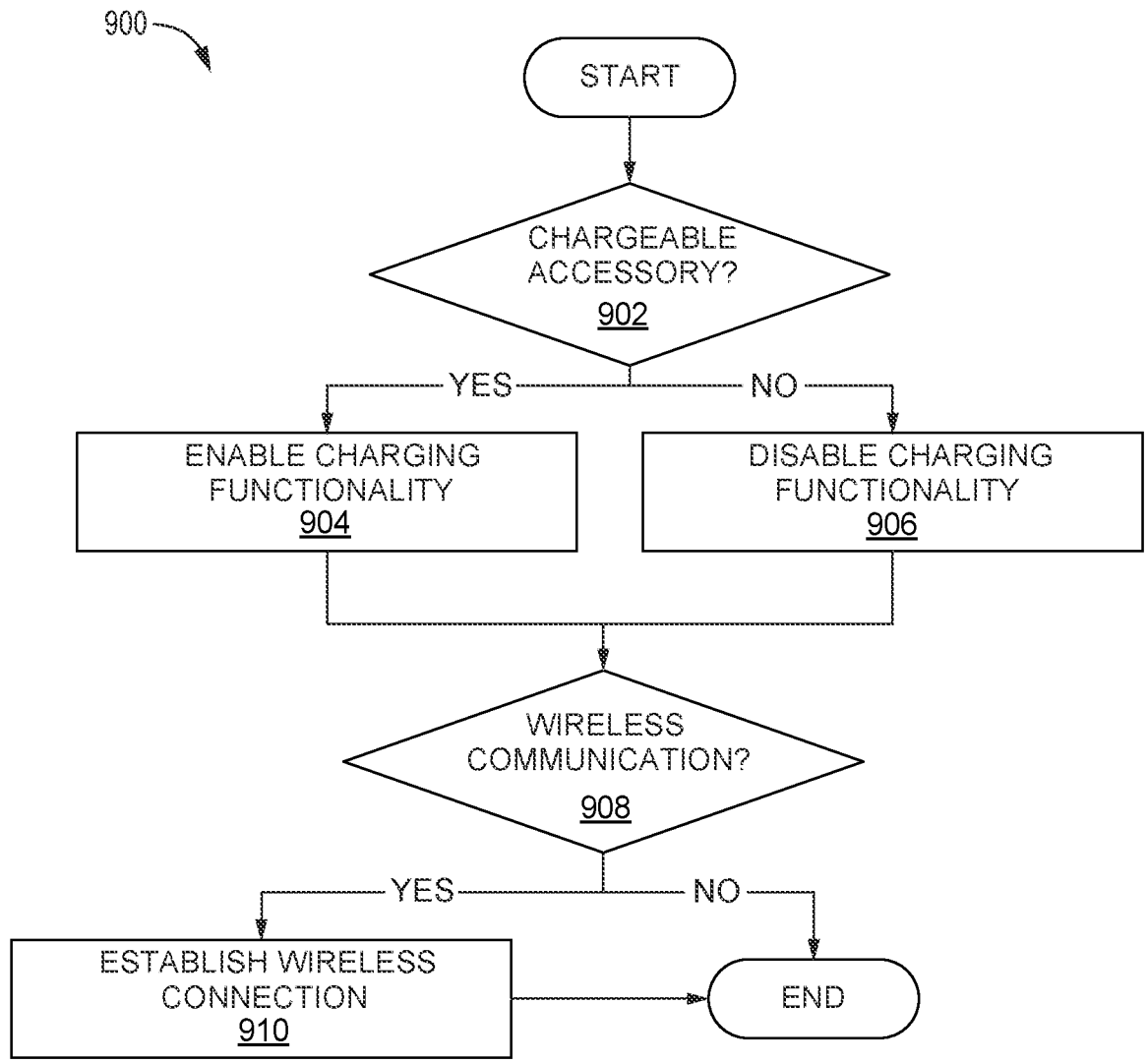
FIG. 9 illustrates an example of a process for performing vehicle program logic based on capabilities of an accessory in a dock, in accordance with embodiments of the present disclosure.

FIG. 9 illustrates an example of a process 900 for performing vehicle program logic based on capabilities of an accessory in a dock, in accordance with embodiments of the present disclosure. In various embodiments, the process 900 can be performed as part of the block 812 of the process 800 of FIG. 8. In certain embodiments, the process 900 can be implemented by any vehicle system that can process data. Although any number of systems, in whole or in part, can implement the process 900, to simplify discussion, the process 900 will be described in relation to the dock 255 of FIGS. 2, 3A, 4A-C, 5, and 6A-B and the BCM ECU 528 of FIGS. 5 and 6A-B.

At decision block 902, the BCM ECU 528 determines whether the accessory in the dock 255 is chargeable, for example, as described relative to FIG. 5. If it is determined at the decision block 902 that the accessory in the dock 255 is chargeable, charging functionality of the dock 255 is enabled at block 904. Otherwise, if it is determined at the decision block 902 that the accessory in the dock 255 is not chargeable, charging functionality is disabled at block 906.

At decision block 908, the BCM ECU 528 determines whether the accessory in the dock 255 supports wireless communication, for example, as described relative to FIG. 5. If it is determined at the decision block 908 that the accessory in the dock 255 does not support wireless communication, the process 900 ends without establishing a wireless connection. Otherwise, if it is determined at the decision block 908 that the accessory in the dock 255 supports wireless communication, a wireless connection with the accessory is established at block 910. The block 910 can include, for example, the BCM ECU 528 sending a command to another ECU 530, such as the XMM ECU, to establish the wireless connection. After block 910, the process 900 ends.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system for adaptive accessory control in a vehicle, the system comprising:
 a dock coupled to the vehicle and including a connection interface comprising:
  an electrical portion configured to electrically connect to a plurality of accessories; and
  a physical lock configured to receive and selectively secure the plurality of accessories; and
 a vehicle control system communicably coupled to the dock and operable to:
  receive, from the electrical portion of the dock, a first resistance value associated with a first accessory electrically connected to the dock via the connection interface;
  determine an identity of the first accessory based on the first resistance value; and
  execute first vehicle program logic to cause the physical lock to enter a locked state or an unlocked state based on the determined identity of the first accessory.

2. The system of claim 1, further comprising a vehicle display, wherein the operability to execute the first vehicle program logic comprises operability to update the vehicle display with a graphical depiction of the determined identity of the first accessory.

3. The system of claim 2, wherein the electrical portion comprises a plurality of pins configured to align with a plurality of electrical contacts of the plurality of accessories.

4. The system of claim 2, wherein the first vehicle program logic identifies one or more conditions under which the physical lock is to be in the unlocked state based on the determined identity of the first accessory, the execution of the first vehicle program logic comprising:
 causing the physical lock to enter the unlocked state upon detection of at least one of the one or more conditions, such that the first accessory is removable from the dock while the physical lock is in the unlocked state; and
 updating the vehicle display with a graphical indication that the physical lock is in the unlocked state.

5. The system of claim 2, wherein the first vehicle program logic identifies one or more conditions under which the physical lock is to be in the locked state based on the determined identity of the first accessory, the execution of the first vehicle program logic comprising:
 causing the physical lock to enter the locked state upon detection of at least one of the one or more conditions, such that the first accessory is secured in the dock while the physical lock is in the locked state; and
 the operability to execute the first vehicle program logic comprises operability to update the vehicle display with a graphical indication that the physical lock is in the locked state.

6. The system of claim 2, wherein the vehicle control system is further operable to:
 receive, from the dock, a second resistance value associated with a second accessory electrically connected to the dock via the connection interface, wherein the second resistance value is different from the first resistance value;
 determine an identity of the second accessory based on the second resistance value; and
 update the vehicle display with a graphical depiction of the determined identity of the second accessory.

7. The system of claim 6, wherein the first accessory is a storage drawer and the second accessory is a portable speaker.

8. The system of claim 2, the vehicle control system is further operable to:
 receive, from the dock, a second resistance value indicative that the dock is in an empty state; and
 update the vehicle display with a graphical depiction of the dock in the empty state.

9. The system of claim 2, wherein the operability to execute the first vehicle program logic comprises operability to:

determine, based on the determined identity of the first accessory, that the first accessory supports wireless communication;

responsive to the determination that the first accessory supports wireless communication, establish a wireless connection with the first accessory;

receive accessory-specific information from the first accessory over the wireless connection; and update the vehicle display with a graphical indication of at least a portion of the accessory-specific information.

10. The system of claim 2, wherein the operability to execute the first vehicle program logic comprises operability to:

determine that the first accessory is chargeable; and responsive to the determination that the first accessory is chargeable, enable charging functionality of the dock.

11. The system of claim 10, wherein the operability to execute the first vehicle program logic comprises operability to:

establish a wireless connection with the first accessory;

receive a battery level of the first accessory over the wireless connection; and update the vehicle display with a graphical indication of the battery level.

12. The system of claim 1, wherein the determined identity is an accessory type, and the first vehicle program logic is based on the accessory type.

13. The system of claim 1, wherein the dock is disposed in an interior console of the vehicle.

14. A method of adaptive accessory control in a vehicle, the method comprising:

receiving, by a vehicle control system, from a dock comprising a physical lock, a first resistance value associated with a first accessory electrically connected to the dock;

determining, by the vehicle control system, an identity of the first accessory based on the first resistance value; and executing, by the vehicle control system, first vehicle program logic to cause the physical lock to enter a locked state or an unlocked state based on the determined identity of the first accessory.

15. The method of claim 14, wherein the executing first vehicle program logic comprises updating a vehicle display with a graphical depiction of the determined identity of the first accessory.

16. The method of claim 15, further comprising:

automatically causing the physical lock to enter the locked state or the unlocked state upon detection of at least one condition; and updating the vehicle display with a graphical indication that the physical lock is in the locked state or the unlocked state.

17. The method of claim 15, further comprising:

receiving, by the vehicle control system, from the dock, a second resistance value indicative that the dock is in an empty state; and updating the vehicle display with a graphical depiction of the dock in the empty state.

18. The method of claim 15, further comprising:

determining, based on the determined identity of the first accessory, that the first accessory supports wireless communication;

responsive to the determination that the first accessory supports wireless communication, establishing a wireless connection with the first accessory;

receiving accessory-specific information from the first accessory over the wireless connection; and updating the vehicle display with a graphical indication of at least a portion of the accessory-specific information.

19. The method of claim 15, further comprising:

determining that the first accessory is chargeable;

responsive to the determination that the first accessory is chargeable, enabling charging functionality of the dock;

establishing a wireless connection with the first accessory;

receiving a battery level of the first accessory over the wireless connection; and updating the vehicle display with a graphical indication of the battery level.

* * * * *